Patented May 3, 1932

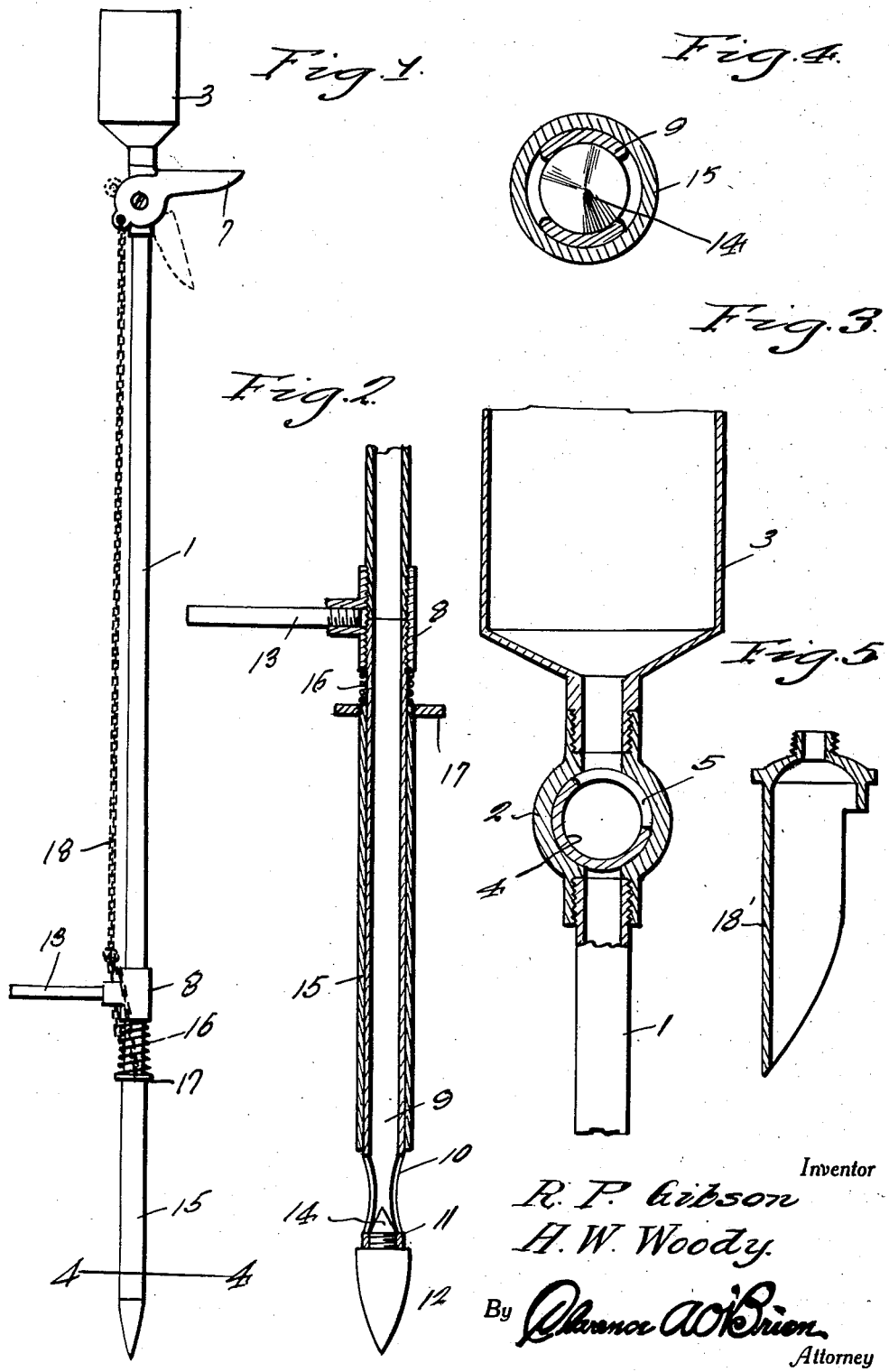

1,856,809

UNITED STATES PATENT OFFICE

RANSOM P. GIBSON AND HARRY W. WOODY, OF BEVERLY, KANSAS, ASSIGNORS OF ONE-THIRD TO W. W. McCANLES

RODENT AND VERMIN POISON DEVICE

Application filed July 1, 1931. Serial No. 548,215.

This invention relates to means for facilitating the placing of poisoned grain or the like into holes or runways of rodents or vermin for poisoning the same, the general object of the invention being to provide means whereby one operator can easily and quickly deposit the poisoned grain or other material in a great number of the runways or holes.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is an elevation of the device.

Fig. 2 is a longitudinal sectional view through the lower part thereof.

Fig. 3 is a longitudinal sectional view through the upper part thereof.

Fig. 4 is a section on the line 4—4 of Fig. 1.

Fig. 5 is a sectional view of an attachment for the device for poisoning ants.

In these drawings, the numeral 1 indicates a pipe having its upper end threaded into a valve casing 2 which in turn is threaded to the lower part of a hopper or container 3. The rotary member 4 of the valve casing is of tubular construction and has an opening 5 therein. Thus in the normal position of the member 4 the opening 5 will be uppermost so that a certain amount of poisoned material will pass from the hopper into the valve member 4 and then when said member 4 is turned by the handle 7 the material therein will be discharged into the pipe 1. Then when the parts are returned to the position shown in Fig. 3, another charge of material will be deposited into the tubular member. This will be discharged into the pipe when the handle is pressed again.

A coupling 8 connects the lower end of the pipe 1 to a second pipe 9 which has the elongaged openings 10 in opposite sides thereof, and into the bottom of which is threaded a shank 11 of a pointed member 12 so that the device can be easily pressed into the ground by placing the foot on a horizontal projecting part 13 threaded into a part of the coupling 8. A wedge or point 14 is formed on the upper end of the shank 11 to divide the material dropping through the pipe 9 and cause it to pass thru the openings 10.

A sleeve or tube 15 is slidably arranged on the lower part of the pipe 9 and is normally held in a position with its lower end closing the opening 10 by a spring 16 placed between the upper end of the pipe 9 and the lower end of the coupling 8. A flange 17 is attached to the upper end of the pipe 15 and a chain or cable 18 connects the flange with a part of the valve operating arm 7. When this arm 7 is lowered, the chain or cable will be pulled upon and thus the tube or sleeve 15 will be raised to uncover the openings 10.

From the foregoing it will be seen that after the poisoned grain or the like is placed in the hopper 3 and the device pressed into the ground by placing the foot on the part 13, by operating the arm 7, grain will be deposited into the lower part of the pipe 9 and as the arm 7 is moved to lowered position, the chain 18 will be pulled upon so that the sleeve or tube 15 will be raised to permit the grain to drop through the openings 10 into the runways or holes of the rodents.

When the handle or arm 7 is released, the spring 16 will force the sleeve or tube 15 downwardly to close the openings 10 and the tubular member 4 will return to the position it occupies in Fig. 3, so that the parts are ready to be again used to deposit another batch of poisoned grain or material into another hole or runway.

As before stated with this invention, one man can easily and quickly deposit poisoned grain or other material into a great number of runways or holes. Fig. 5 shows an attachment 18' which is susbtituted for the point 12 where the device is used for poisoning ants. As shown, this device is of semi-circular shape in cross section and pointed so that the poisoned material will drop from tube 9 into the device 18' and thus into the ant hills.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described our invention, what we claim as new is:

1. A device of the class described comprising a tube having a point at one end thereof, said tube having an opening therein adjacent the pointed end, a spring pressed sleeve for normally closing the opening, a hopper on the upper end of the tube, a valve for controlling the flow of material from the hopper to the tube, and means for raising the sleeve to expose the opening when the valve is moved to open position.

2. A device of the class described comprising a tube, a hopper at one end thereof, a valve for controlling the flow of material from the hopper through the tube, a pointed member at the lower end of said tube, said lower end of the tube having a pair of oppositely arranged openings therein, a wedge at the lower end of the tube for causing the material to pass through the openings, a sleeve slidably arranged on the lower part of the tube, a spring for holding the sleeve in a position closing the openings, a handle for operating the valve, and a flexible connection between the handle and the sleeve whereby the sleeve will be raised to expose the openings when the handle is moved to open the valve.

3. A device of the class described comprising a tube having a point at its lower end, and a pair of oppositely arranged openings adjacent said lower end, a sleeve sliding on the lower part of the tube for closing the openings, a spring for normally holding the sleeve in closing position, a foot rest on the tube, a hopper connected with the upper end of the tube, valve means controlling the flow of material from the hopper to the tube, a handle for operating the valve member, and a flexible member between the handle and the sleeve whereby said sleeve is raised when the handle is moved downwardly to cause the valve to deposit material into the lower part of the tube.

In testimony whereof we affix our signatures.

RANSOM P. GIBSON.
HARRY W. WOODY.